May 9, 1950   E. R. BULE   2,507,140
BRAKE CONTROL MEANS
Filed Dec. 16, 1947   2 Sheets-Sheet 1
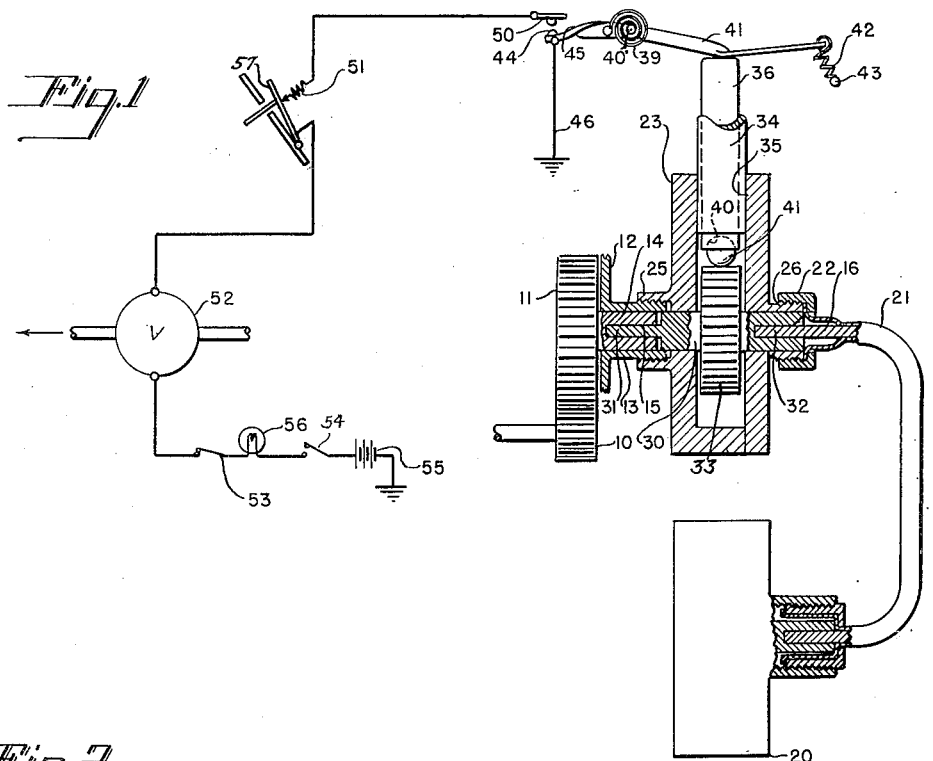
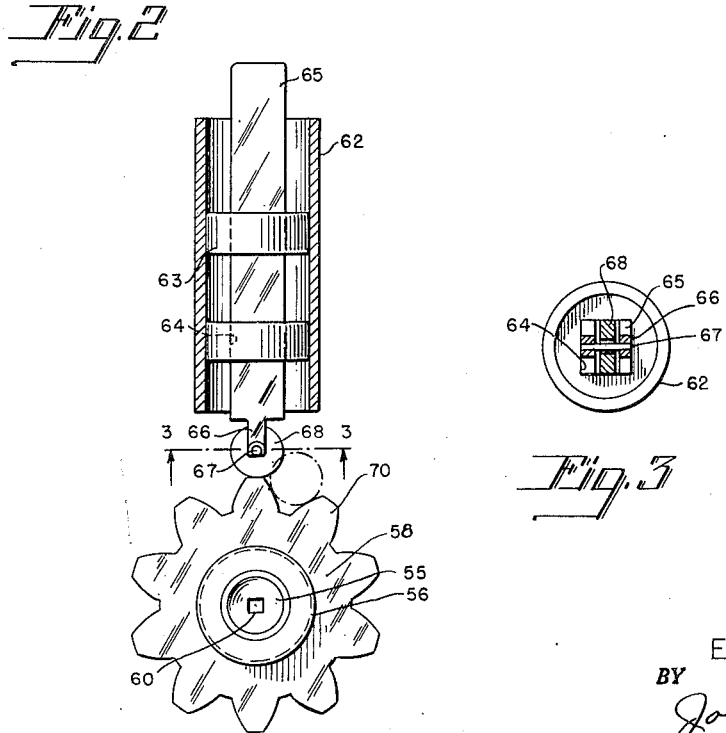
INVENTOR.
Edward R. Bule
BY John P. Chandler
his ATTORNEY May 9, 1950 E. R. BULE 2,507,140
BRAKE CONTROL MEANS
Filed Dec. 16, 1947 2 Sheets-Sheet 2

INVENTOR.
Edward R. Bule
BY John P. Chandler
his ATTORNEY

Patented May 9, 1950

2,507,140

UNITED STATES PATENT OFFICE 2,507,140

BRAKE CONTROL MEANS

Edward R. Bule, Brooklyn, N. Y.

Application December 16, 1947, Serial No. 792,056

6 Claims. (Cl. 192—3)

This invention relates to vehicle brake control devices, and has for it principal object the provision of novel means for use in connection with hydraulic brakes for preventing roll-back or even forward movement of a car after it has been brought to a halt through application of the foot brakes. Anti-roll-back devices are known, although they have not functioned in a particularly satisfactory manner. A device of this character is important, however, since it increases the safety factor in driving. It is especially useful when a car is brought to a stop for a traffic light on a road which is inclined.

The device of the present invention is automatic and positive in operation, is relatively inexpensive to construct, and is simple to install. It consists essentially of control means for retaining the fluid in the brake lines under pressure after the car has been stopped and the foot brake is released. The fluid is maintained under pressure until it is desired to again start movement, at which time the pressure is automatically released as the driver depresses the accelerator just prior to starting.

A valve is employed in connection with the present control means, the valve being of the one-way type and arranged to permit forward movement of the fluid at all times from master brake cylinder to the brake lines, but arranged when closed to prevent the return flow to the cylinder. Operation of the valve is controlled by electro-magnetic means. The valve is a part of the general combination, but its specific construction forms no part of the present invention.

The control unit includes a novel switch which is associated with the vehicle transmission, and which is open as long as there is any movement of the car and is closed when movement, forward or rearward, ceases. Thus, when this switch is closed, it closes a circuit which includes the electro-magnet or solenoid associated with the valve. The circuit is opened when the vehicle is to resume its travel by a vacuum switch connected with the intake manifold, or by a normally closed switch which is arranged to be opened when the accelerator is depressed, or by other suitable means.

In the drawings:

Fig. 1 is a diagrammatic view showing the circuit employed in connection with a device embodying the present invention, the view further showing a section taken through a portion of such device.

Fig. 2 is a view, partly in section, showing an alternative construction.

Fig. 3 is a section taken on line 3—3 of Fig. 2.

Figure 4:
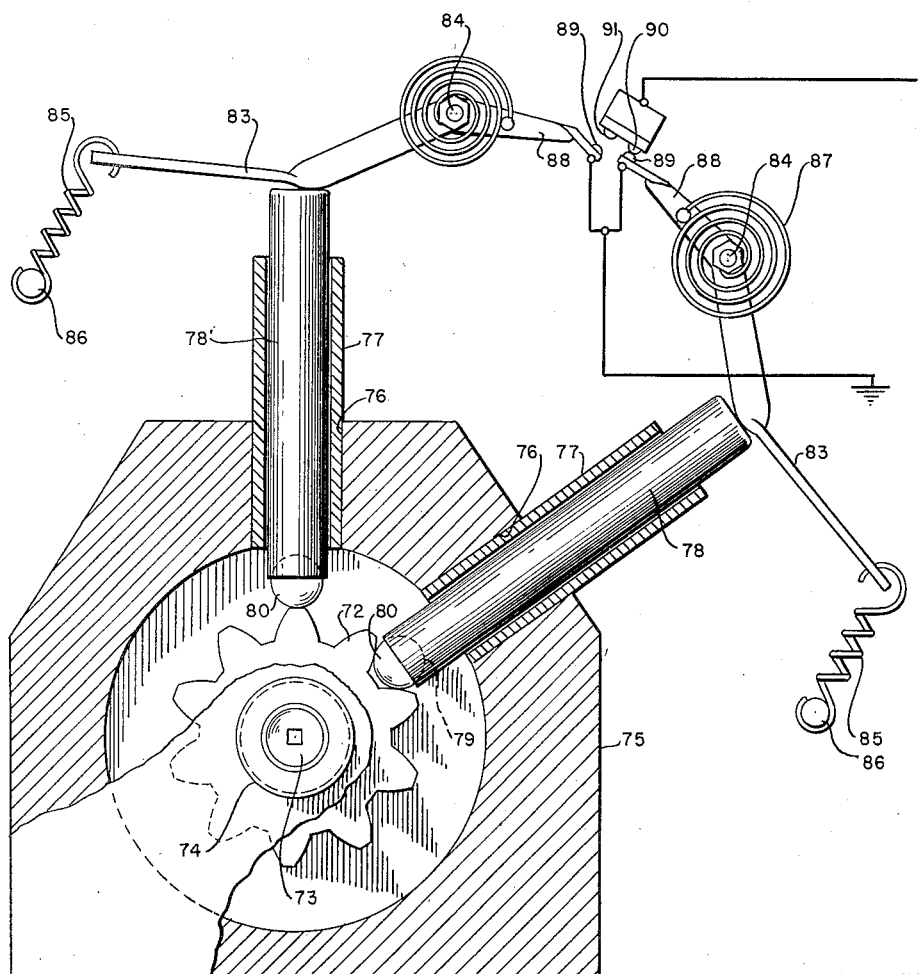
Fig. 4 is a section taken through another modified form of construction.

In Fig. 1 there are shown gears 10 and 11 associated with the vehicle transmission and the end wall 12 of the transmission housing. A boss 13 forms one bearing for a shaft 14 having a non-circular axial opening 15 which normally receives the cable 16 of a conventional speedometer 20. The cable housing 21 is provided at its inner end with an internally-threaded cap 22 which is normally received on the externally-threaded boss 13.

When the device of the present invention is employed, this cap is removed and the device inserted between the boss 13 and cap 22. The device includes a gear housing 23 having a cover plate. An internally-threaded boss 25 on the housing is arranged for connection with boss 13, and an externally-threaded boss 26 is connected with cap 22. A shaft 30 is journalled within the housing and is provided at one end thereof with a non-circular portion 31 for insertion within opening 15, and at its opposite end with an opening 32 which receives the terminal of cable 16. A gear 33 with common involute teeth is loosely keyed to this shaft. No details of the key means forming the driving connection between the shaft and the gear are shown, since a construction of this character is conventional and well known. There should be backlash between the gear and the shaft, however, of at least the width of one tooth.

At one end of the housing, sleeve 34 is received within a bore 35. A plunger 36 is mounted for sliding movement within the sleeve. At its inner end, plunger 36 is provided with a hemispherical recess 40 which receives a ball 31 which is arranged to contact the teeth. A switch in the form of a bell-crank lever is pivotally mounted at 40', one arm 41 of the lever contacting the outer terminal of plunger 36. Spring 42 connects the outer terminal of portion 41 with a fixed portion 43. If desired, a spiral spring 39 may also be connected with the lever. A contact 44 is carried on opposite arm 45 of the lever. This contact is grounded, as shown at 46. A fixed contact 50 is engaged by contact 44 when the switch is closed. The switch elements and operating means therefor may be enclosed within a suitable casing (not shown).

The circuit includes a switch 51, a solenoid valve 52 previously referred to, a safety switch 53, the ignition switch 54, and a source of power 55. It may also include a dial light 56. Switch 51 may be a vacuum switch which is normally closed and which is connected with the intake manifold. Thus, when the accelerator is depressed just prior to resuming movement of the car, the switch is caused to open. Alternatively, switch 51 may comprise a simple switch which is normally closed and which is disposed below the accelerator pedal 57, as shown schematically in Fig. 1. Similarly, when the accelerator is depressed the switch is opened, thus opening the circuit.

As long as there is movement of the car, the gear teeth will retain the ball 41 and plunger 36 in outer position. This retains the switch open. When, however, forward or rearward movement ceases, the ball will descend into the root between two teeth and close the switch. Because of the loose connection between the gear and the shaft, the ball will always become so seated, regardless of the position of shaft 30 when rotation ceases.

The operation of the device is as follows. Switch 51 is normally closed, and the same is true of safety switch 53. Switch 54 is similarly closed when the ignition circuit is closed. Thus, the brake circuit is closed when car movement ceases. The foot brake is normally used to bring the car to a halt, and this brake is almost invariably not released until the car stops. The fluid in the brake lines is thus under pressure, and this closing of the circuit closes the valve and retains the pressure in the brake lines. The driver depresses the accelerator before letting in the clutch for starting, which opens the circuit as earlier described. This opens valve 52, releasing the fluid.

Ball 41 is shown as a separate element disposed within a suitable recess 40. This action distributes wear over the entire surface of the ball. If desired, however, the ball may be formed integrally with the plunger.

A modified arrangement is shown in Figs. 2 and 3 wherein gear 58 is mounted on a shaft 55 journalled in a bearing 56. The shaft is provided with a non-circular portion 60 corresponding to portion 31 in Fig. 1. There is also provided a loose connection (not shown) between the gear and the shaft which permits of adequate backlash. A sleeve 62 forms a support for bushings 63 which are secured therein in fixed relation. These bushings have non-circular openings 64 which form a support for a plunger 65 mounted within the bushings for sliding movement. At its lower end, plunger 65 is bifurcated, as shown at 66, the two portions formed by such bifurcation forming a support for a pin 67 upon which a roller 68 is mounted. A contact member similar to that shown at 41—45 in Fig. 1 may be employed for engaging the upper end of the plunger. Roller 68 is so mounted as to engage the teeth 70 of the gear.

It will thus be seen that so long as there is movement in the car, the teeth retain the plunger and the roller in outwardly-extended position, as shown in Fig. 2. When, however, movement ceases, rotation of gear 54 similarly ceases, and the roller is permitted to drop into the recess between two gear teeth. By providing the backlash between the gear and its supporting shaft, the roller may always become seated between two teeth regardless of the point at which the gear ceases rotation.

A further modified arrangement is shown in Fig. 4 which is similar in some respects to the structure of Fig. 1, except that two sets of plungers are provided. In this instance, gear 72 may be rigidly keyed to shaft 73 which is journalled in bearing 74. The gear is disposed within a housing 75 which has openings 76 for receiving sleeves 77, two of such sleeves being shown. The sleeves receive plungers 78 and 78' for sliding movement, and at the inner end of each plunger there is a recess 79 which receives a ball 80. The outer end of each plunger is engaged by one arm 83 of a bellcrank lever which is pivotally mounted at 84. Arm 83 is engaged by a spring 85 which is fixed at its opposite end, as shown at 86. Another spiral spring 87 may also be employed in the manner shown.

The opposite arm 88 of the lever is provided with a contact 89 which engages one contact 90 when gear 72 ceases rotation in such a position as to permit the ball associated with plunger 78 to enter the root between two teeth. In this position, the ball associated with plunger 78' is held in extended position. The similar contact member 89 on the other bell-crank lever engages a second contact 91 when the gear ceases rotation in another position.

While three forms or embodiments of the invention have been shown and described herein for illustrative purposes, and the construction and arrangement incidental to three specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. In a vehicle provided with a transmission and hydraulic brakes, the combination of automatic means for retaining pressure in the brake lines after manual application of the brakes to prevent rolling of the vehicle, such means comprising an electro-magnetically operated valve for retaining such pressure, and control means for the valve including a switch which is normally open during movement of the vehicle and provided with a toothed gear connected for rotation with the vehicle transmission, a plunger mounted for reciprocating movement radially of the gear and arranged to be held in extended position by the gear teeth during rotation of the gear, a switch lever urging the plunger against the teeth, and a circuit including the valve and the switch arranged to be closed when the plunger moves inwardly.

2. In a vehicle provided with a transmission, hydraulic brakes and an engine accelerator, the combination of means for retaining pressure in the brake lines after manual application of the brakes to prevent rolling of the vehicle, such means comprising an electro-magnetically operated valve for retaining such pressure, and control means for the valve including a switch which is normally open during movement of the vehicle and provided with a toothed gear connected with the vehicle transmission, a plunger mounted for reciprocating movement radially of the gear and arranged to be held in extended position by the gear teeth during rotation of the gear, a switch lever urging the plunger against the teeth, a circuit including the valve and the switch arranged to be closed when the plunger moves inwardly, and a normally closed switch associated with the accelerator and arranged to be opened when the accelerator is depressed.

3. In a vehicle provided with a transmission, an engine accelerator, hydraulic brakes, and an electro-magnetically operated valve for retaining pressure in the brake lines, the combination of automatic control means for the valve including a switch which is normally open during movement of the vehicle and provided with a toothed gear connected with the vehicle transmission, a plunger mounted for reciprocating movement radially of the gear and arranged to be held in extended position by the gear teeth during rotation of the gear, a switch including a switch arm urging the plunger against the teeth, a circuit including the valve and the switch arranged to be closed when the plunger moves inwardly, and a normally closed switch associated with the accelerator arranged to open the circuit when the latter is depressed.

4. In a vehicle provided with a transmission and hydraulic brakes, the combination of means for retaining pressure in the brake lines after manual application of the brakes to prevent rolling of the vehicle, such means comprising an electro-magnetically operated valve for retaining such pressure, and control means for the valve including a switch which is normally open during movement of the vehicle and provided with a toothed gear connected for rotation with the vehicle transmission and provided with a backlash connection therebetween, a plunger mounted for reciprocating movement radially of the gear, a roller carried at the inner end of the plunger, the roller and plunger being arranged to be held in extended position by the gear teeth during rotation of the gear, a switch lever urging the plunger against the teeth, a circuit including the valve and the switch arranged to be closed when the plunger moves inwardly, and means for opening the circuit comprising a switch operatively connected with engine acceleration means.

5. In a vehicle provided with a transmission and hydraulic brakes, the combination of means for retaining pressure in the brake lines after manual application of the brakes to prevent rolling of the vehicle, such means comprising an electro-magnetically operated valve for retaining such pressure, and control means for the valve including a switch which is normally open during movement of the vehicle and provided with a toothed gear connected with the vehicle transmission, plural plungers mounted for reciprocating movement radially of the gear and arranged to be held in extended position by the gear teeth during rotation of the gear, the inner terminals of the plungers being provided at their inner ends with roller means and being so spaced apart as to cause one of such roller means to move inwardly when rotation of the gear ceases, switch levers urging the plungers against the teeth, and a circuit including the valve and the switch arranged to be closed when one plunger moves inwardly.

6. In a vehicle provided with a transmission and hydraulic brakes, the combination with said vehicle of means for retaining pressure in the brake lines after manual application of the brakes to prevent rolling of the vehicle, such means comprising an electro-magnetically operated valve for retaining such pressure, and control means for the valve including a switch which is normally open during movement of the vehicle and provided with a toothed gear connected with the vehicle transmission, a plunger and means supporting such plunger for reciprocating movement radially of the gear, a ball associated with the inner end of the plunger and arranged to contact the gear teeth during rotation of the gear and to enter a recess between teeth of the gear when car movement ceases, a switch lever urging the plunger and the ball against the teeth, and a circuit including the valve and the switch arranged to be closed when the plunger moves inwardly.

EDWARD R. BULE.

REFERENCES CITED

The following references are of record in the file of this patent:

UNITED STATES PATENTS

| Number | Name | Date |
|---|---|---|
| 1,213,799 | Perrin | Jan. 23, 1917 |
| 1,930,561 | Kemp | Oct. 17, 1933 |
| 1,969,926 | Eichoff | Aug. 14, 1934 |
| 2,308,822 | Murphy | Jan. 19, 1943 |
| 2,313,430 | Geopfrich | Mar. 9, 1943 |
| 2,329,156 | Coffey | Sept. 7, 1943 |
| 2,334,611 | Darling | Nov. 16, 1943 |